Nov. 8, 1949  W. F. HEROLD  2,487,134
WHEEL MOUNTING
Filed March 22, 1944  5 Sheets-Sheet 1

Inventor
Walter F. Herold
By Rockwell & Bartholow
Attorneys

Nov. 8, 1949 W. F. HEROLD 2,487,134
WHEEL MOUNTING
Filed March 22, 1944 5 Sheets-Sheet 3
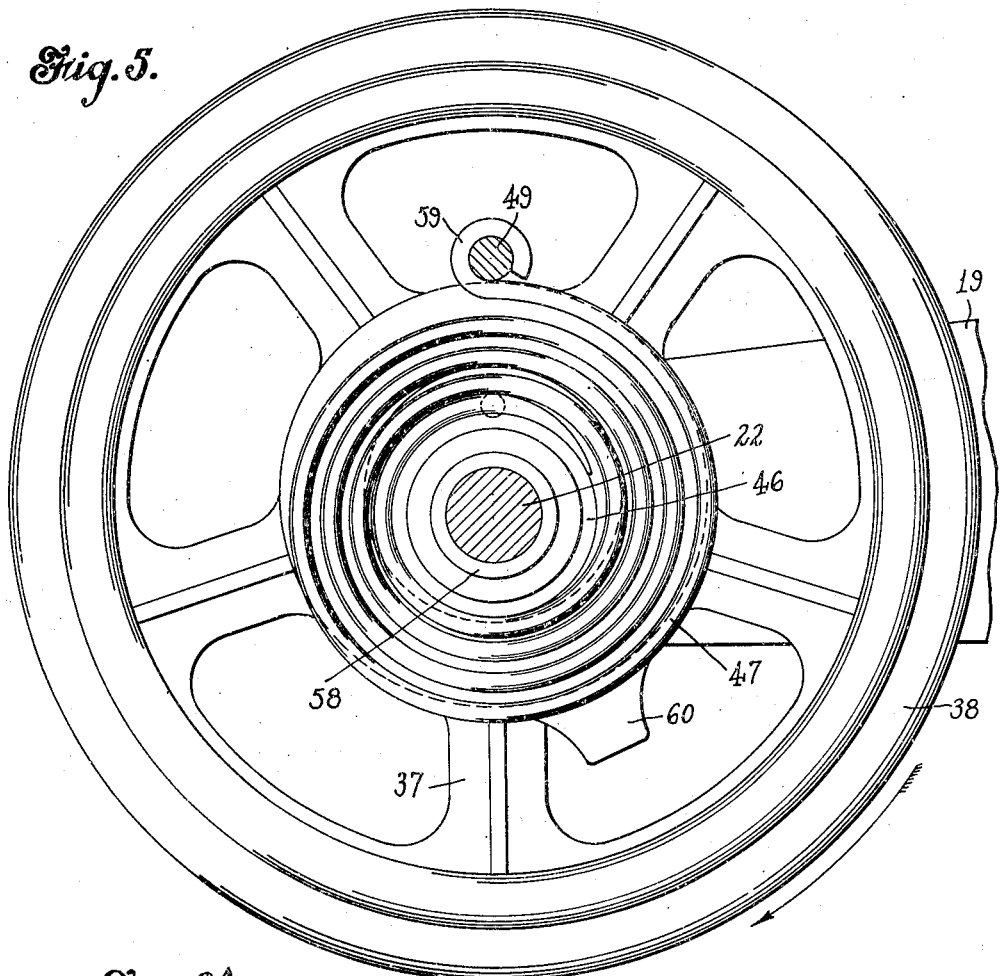
Fig. 5.
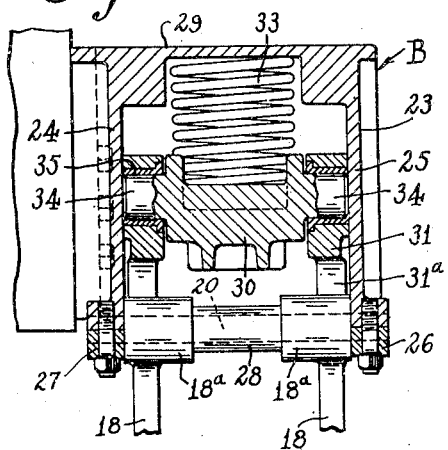
Fig. 3ᴬ.
Inventor
Walter F. Herold
By Rockwell & Bartholow
Attorneys Nov. 8, 1949 — W. F. HEROLD — 2,487,134
WHEEL MOUNTING
Filed March 22, 1944

Patented Nov. 8, 1949

2,487,134

UNITED STATES PATENT OFFICE 2,487,134

WHEEL MOUNTING

Walter F. Herold, Easton, Conn., assignor to The Bassick Company, Bridgeport, Conn., a corporation of Connecticut Application March 22, 1944, Serial No. 527,557

14 Claims. (Cl. 305—9)

This invention relates to wheel mountings and, more particularly, to resilient mountings for wheels of land vehicles. The invention has particular application to tractors of the track-laying type, in which connection the wheel mounting of the invention is very useful and advantageous as applied to bogie wheels which support the vehicle body on the lower run of the endless track, but the invention is also applicable to wheels used in road vehicles and in various other relations.

The invention concerns itself, among other things, with the problem of springing the wheels of land vehicles that may travel at a fairly high rate of speed. There is need for proper springing of the vehicle, both from the point of view of carrying the loads imposed on the supporting wheels, and also from the point of view of the impacts or shocks which are received as a result of obstacles which are encountered or from unevenness on the surface over which the vehicle travels.

The invention has to do, therefore, in one phase, with a land vehicle equipped with load bearing springs and also with impact receiving springs, the latter having a predetermined relation to the former, in order that certain new and improved results may be achieved.

One of the objects of the invention is to provide a vehicle in which wheels supporting the vehicle on the ground are equipped with impact receiving springs and in which these springs are coordinated in an improved manner with springs which are primarily load bearing springs.

Another object is to provide the improvements just mentioned in a vehicle of the track laying type where the wheels which are mounted and operate in an improved manner are bogie wheels over which the endless track travels.

Another object is to provide an improved mounting for bogie wheels of track laying vehicles whereby what may be termed road shocks are much more effectively taken up and absorbed than has been the case previously.

To these and other ends, the invention consists in the novel features and combinations of parts to be hereinafter described and finally pointed out in the claims.

In the accompanying drawings:

Fig. 3A is a section on line 3A—3A of Fig. 1;

Fig. 5 is a similar view, showing the same wheel in an upper position in its support due to shock or impact occasioned by uneven ground;

Fig. 9 is a diagrammatic view, showing the endless track at one side of the vehicle.

Figure 1:
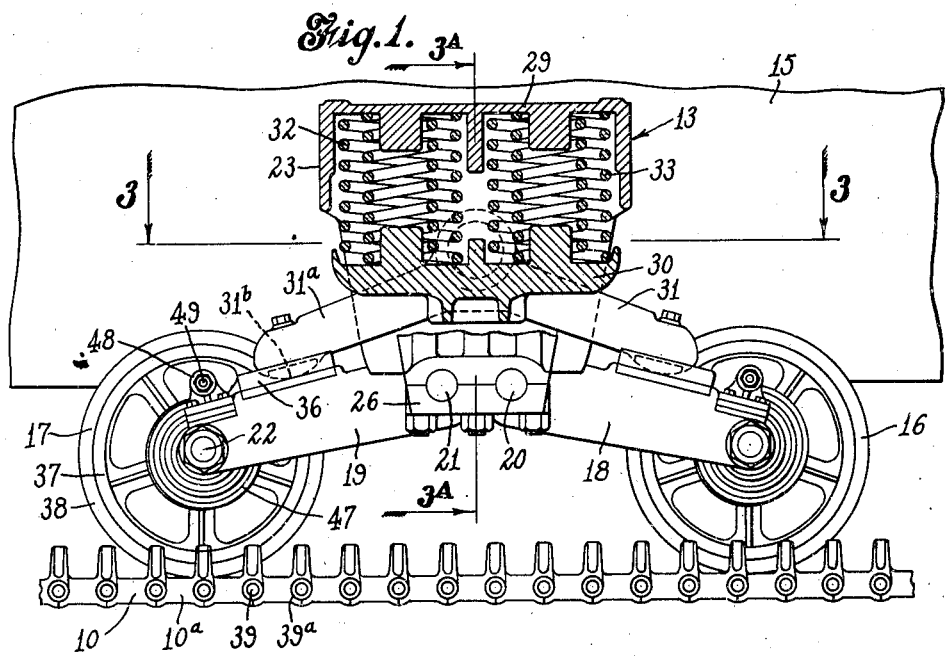
Fig. 1 is a fragmentary side elevation of a track laying vehicle equipped with my improvements, the load bearing springs and their housing being shown in section, the two bogie wheels shown being in positions which they assume when the vehicle stands on a level surface.

In the instance selected for illustrating the invention, the latter is embodied in a track laying tractor structure and particularly in the supports provided for the bogie wheels which support the lower run of the endless track. For purposes of illustration merely, the bogie wheels are shown in association with load carrying springs of a certain kind, which, through a certain pressure arrangement or mechanism, cause the wheels to be pressed against the lower run of the track; but many variations can be made so far as these features are concerned. In general, the arrangement of one of the tracks or belts on the tractor may be as illustrated in the diagram, Fig. 9, where an endless track 10 is driven from a forward sprocket wheel 11 and runs at the rear of the vehicle over an idler 12, the track loop being supported and tensioned by devices 13 and 14 located within the bight of the track and arranged in tandem formation, each such device having a pair of bogie wheels pressing against the lower run of the track.

It may be assumed that the wheel mounting illustrated in the remaining views of the drawings is the device 13 of Fig. 9 or a device having a similar location and function.

Figure 2:
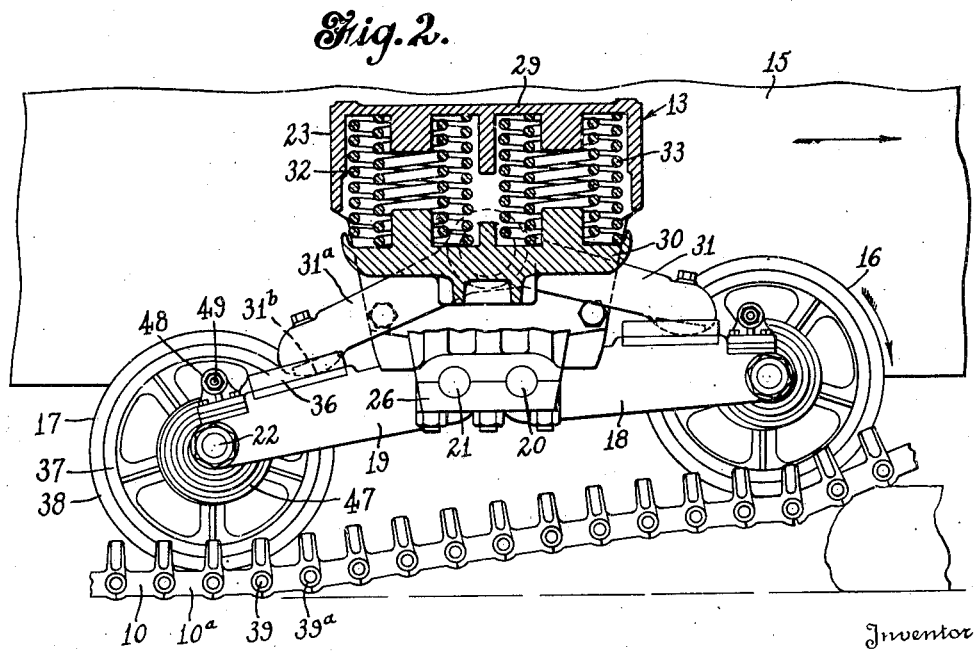
Fig. 2 is a view similar to Fig. 1, showing the positions which the parts assume in encountering an obstacle.
Figure 3:
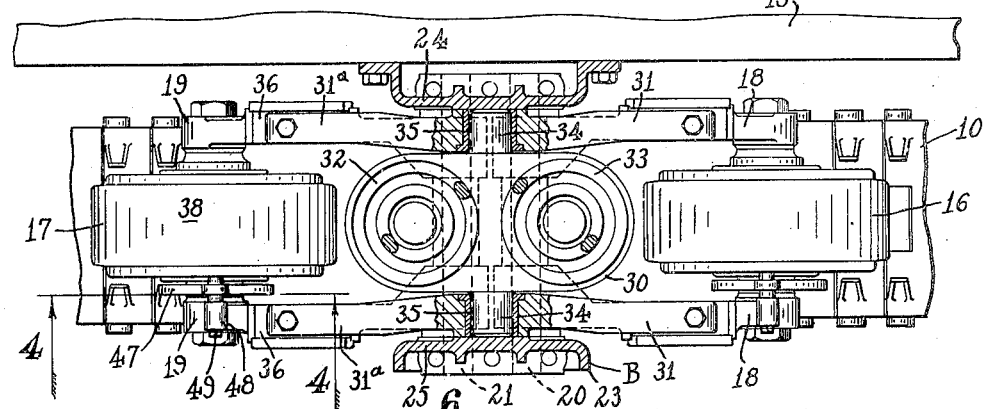
Fig. 3 is a section on line 3—3 of Fig. 1.

In Figs. 1, 2, and 3, the body of the tractor or other vehicle is indicated at 15 and the front and rear bogie wheels of the assembly are indicated at 16 and 17. These wheels are independently swung from the body of the vehicle, being carried, in this particular instance, at the free ends of arms of which the other ends are pivoted to the body to swing in a vertical plane extending lengthwise of the vehicle. The wheel 16 is carried by forwardly extending arms 18, and the wheel 17 by rearwardly extending arms 19. In the form shown, the arms 18 and 19 are pivotally mounted by means of pins 20 and 21, respectively, said pins being located in proximity to each other and mounted at the lower end of a bracket structure which is applied to the side of the vehicle body and is generally indicated at B. This bracket structure B, as hereinafter described, carries springs and other devices for imposing downward pressure on the bogie wheels 16 and 17.

The arms 18 and 19 are of duplex arrangement, there being an arm at each side of each wheel, the two arms of each wheel being suitably connected to the ends of the wheel axle, the axle of each wheel being indicated at 22. The bracket member B has a chambered member or housing 23 having an inner wall 24 suitably fastened to the side of the vehicle body, and an outer wall 25. The pins or pivots 20 and 21 extend between and are held in notches at the lower portions of these walls 24 and 25, being held in position in the notches by lower positioning blocks 26 and 27. In Fig. 3A, the pin 20 is shown, and it is seen that arms 18, associated with this pin and pivoting thereon, have end sleeves 18ª embracing portions of the pin, there being a spacing sleeve 28 interposed between the sleeves. It is, of course, understood that the arms 19 are mounted in a similar manner.

The mechanism whereby downward pressure is exerted upon the bogie wheels may be greatly varied, but, in the case illustrated, it includes helical compression springs located within the housing 23 and interposed between the top wall 29 of this housing and a vertically movable follower plate 30, said plate 30 acting on forked pressure members 31 that exert downward pressure upon the arms 18 and 19. The load carrying springs in the case illustrated comprise a rearwardly located pair 32 of concentric helical springs and a forwardly disposed pair 33, these springs pressing downwardly upon the follower plate 30, which has inner and outer trunnions 34. Each trunnion 34 is located adjacent a side wall of the housing and is engaged in an opening 35 provided in the upper part of a pressure member 31. One of the pressure members 31 acts against an arm 18 and an arm 19, and the other pressure member acts against another arm 18 and another arm 19. Each member 31 comprises arms 31ª branched off from each other at an obtuse angle, and, at the extremity of each arm 31ª, is a rounded part 31ᵇ in the nature of a foot, bearing against a pressure plate 36 mounted upon the upper edge portion of the arm 18 or 19, as the case may be. The arrangement is such that the devices 31 are rockably mounted on their intermediate pivots provided by the trunnions 34, so that downward pressure of the springs 32 and 33 on the bogie wheels is continued as a forward wheel and a rearward wheel are displaced relatively to each other in a generally vertical direction.

The bogie wheels 16 and 17 are preferably formed with a rigid body 37 and a solid rubber tread 38, the latter having a relatively wide surface bearing against the track links 10ª at their intermediate portions. The links 10ª are pivoted together by means of rods or pintles 39, and these pintles usually carry, at their ends, projections 39ª which are engaged by the sprocket wheel 11 (Fig. 9) for the purpose of driving the track or belt. The track links are so arranged relatively to the bogie wheels that the track will not be displaced laterally relatively to the wheel, and for this purpose the links 10ª are usually equipped with guide lugs 40 projecting upwardly alongside the lower part of the wheel in the manner shown in the drawings, although this is only by way of example.

In the improved wheel mounting, each bogie wheel has a resilient mounting relatively to its carrying arm structure or like support so that when the wheel is subjected to sudden shocks or impacts it can have a certain amount of cushioned movement relatively to its support. In the preferred form, the wheel proper is revoluble on a skein having an eccentric mounting with respect to a stationary axle provided for the wheel, and the wheel is cushioned by means of a spring in the form of a pancake spiral, the outer end of the spring being connected to the wheel support and the other end being connected to the skein. The arrangement is such that, when the skein is turned in a direction for raising the wheel relatively to the axle, the spring is energized by a winding action thereof. This mechanism is used for counteracting the effects of road shocks and uneven ground, in the manner hereinafter described.

Figure 6:
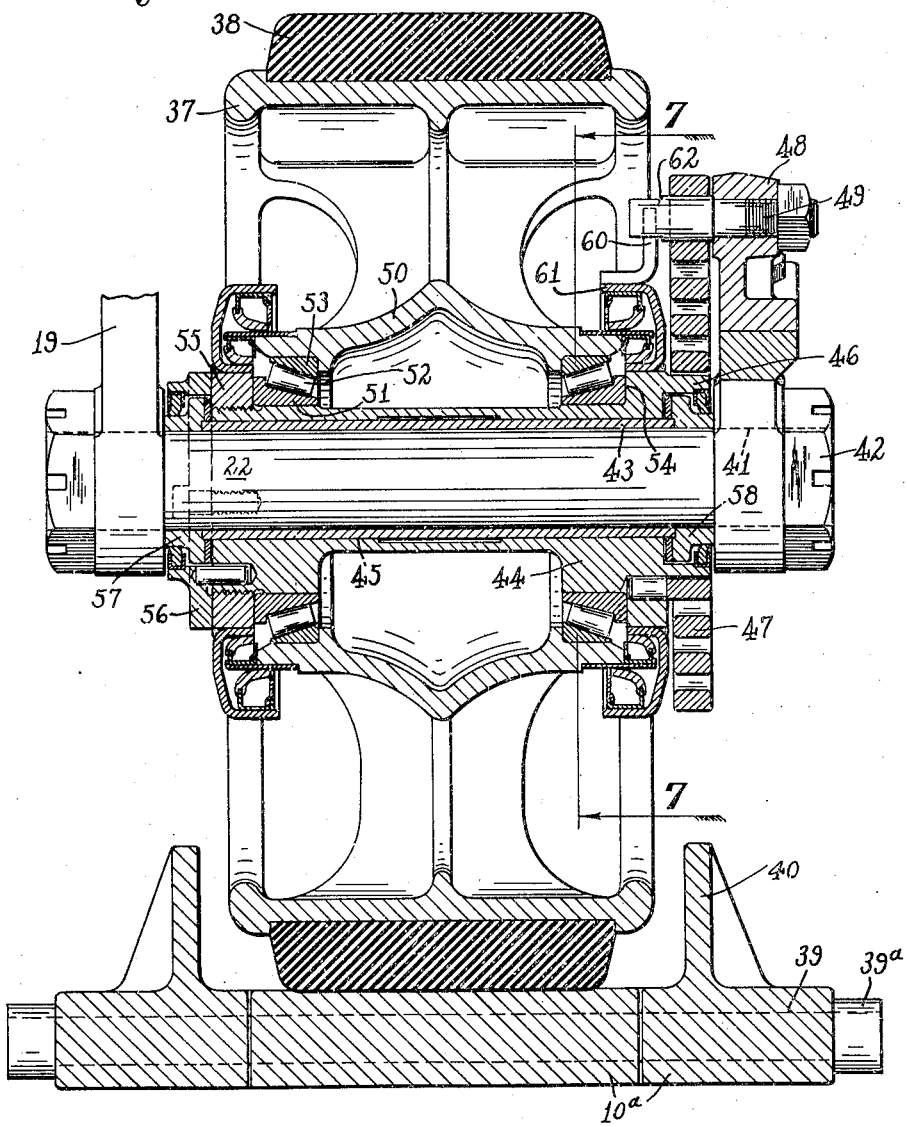
Fig. 6 is a section on line 6—6 of Fig. 4.

Referring to Fig. 6 is is apparent that the axle 22 is in the nature of a pin extending between the arms 19 and passing through holes 41 in said arms and fastened in place by means such as nuts 42. For a considerable portion of its length, the axle 22 is embraced by a sleeve 43. This sleeve is surrounded by a skein 44 which is of generally cylindrical shape but is provided with an inner bore 45 that is eccentrically located relatively to the skein. At one end, usually the outer end in reference to the vehicle, the skein is continued axially beyond the face of the wheel, as shown at 46, in order to be fastened to a spiral spring 47, the outer end of the spring being fastened to one of the arms 19 by means such as a bracket 48 and a fastening bolt 49. The body 37 of the wheel comprises a hub portion 50 which embraces the skein 44 and is revolubly mounted thereon by means of suitable bearings. In the case shown, the bearings comprise inner races 51, tapered rollers 52, and outer races 53. One of the roller bearings is held in place by a shoulder 54 on that end of the skein which is adjacent the spring 47. The other roller bearing is held in place by a nut 55, threaded on the other end of the skein, and the nut 55 is held in place by a cap 56. Suitable sealing rings may be employed for preventing dust and dirt from obtaining entrance into the roller bearings.

The cap 56 has an eccentric hole and is arranged over a thrust collar 57 interposed between the end of the sleeve 43 and the adjacent supporting arm, and the cap is secured in place by suitable means which it is unnecessary to illustrate in detail. A thrust collar 58, similar to the collar 57, is used at the other end of the axle for spacing the sleeve 43 from the supporting arm at that side of the assembly.

Figure 4:
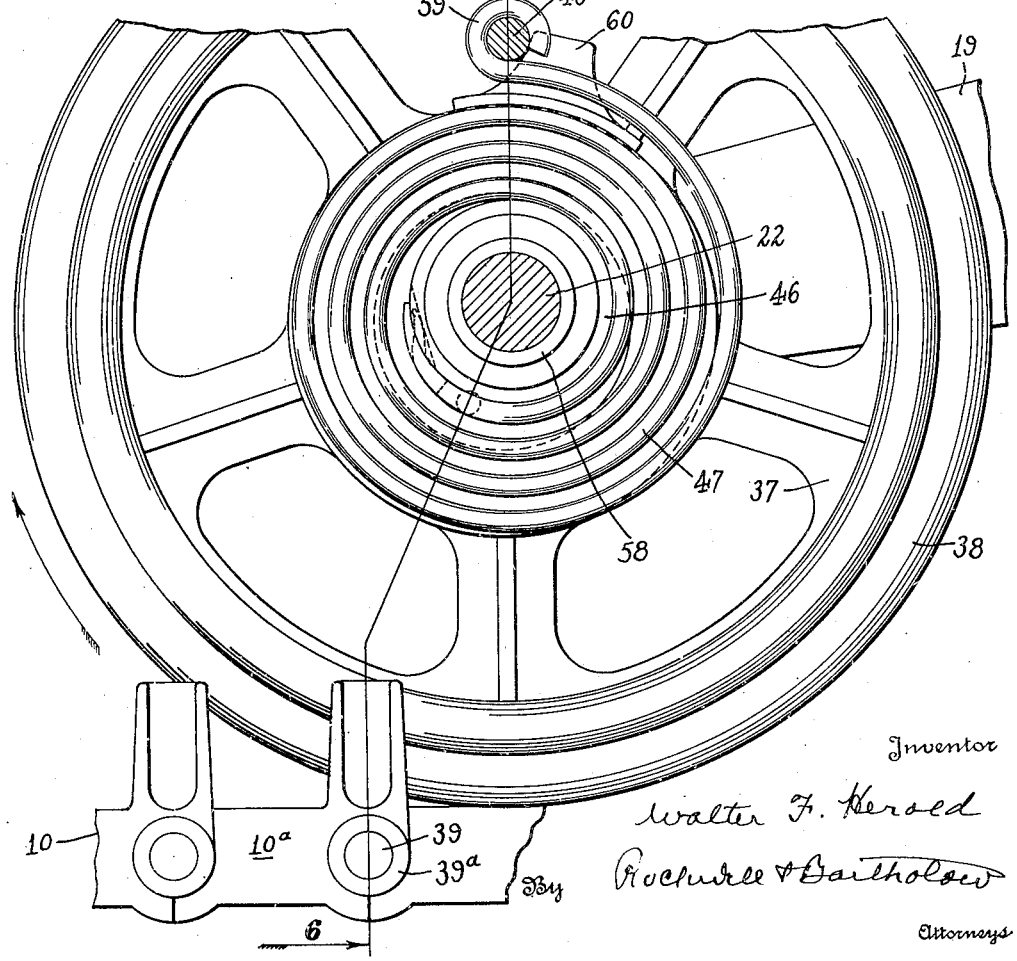
Fig. 4 is an enlarged view of the left hand bogie wheel of Fig. 1, certain parts being broken away, showing the position of the spiral spring when it is not subjected to shock or impact.

The pancake spiral spring 47 is preferably constructed of steel and the same has a number of turns which, in the normal position of the wheel shown in Fig. 4, are spaced from each other to an appreciable degree. The innermost turn of the spring embraces the enlarged portion or extension 46 at the end of the skein. It will be noted that, in the particular form shown, the outer cylindrical surface of portion 46 is concentric with the axle 22 and that the innermost turn of the spring conforms to portion 46 over a considerable part of the circumference of the latter. The extremity of the spring preferably lies against the cylindrical surface of portion 46 and is secured thereto by means which it is unnecessary to illustrate in detail, as the same form no part of the present invention. The outer end of the spring may be secured to the bolt 49 or like member in any suitable manner as by having an eye 59 formed on the spring and engaging the bolt 49. The part 48 supporting the bolt from the arm is shown as a separate part welded to the arm, but, obviously, variation can be made in this respect.

For holding the skein in a predetermined angular position, suitable means are provided, and, in this particular instance, radial lug 60, projecting outwardly from a flanged sheet metal collar 61 welded or otherwise suitably secured to the skein portion 46, is adapted to make contact with a stop pin 62 which may be conveniently provided as an extension on the inner end of the bolt 49. In the normal or unwound position of the spring, the lug 60 makes contact with the stop pin in the manner shown in Fig. 4.

Figure 7:
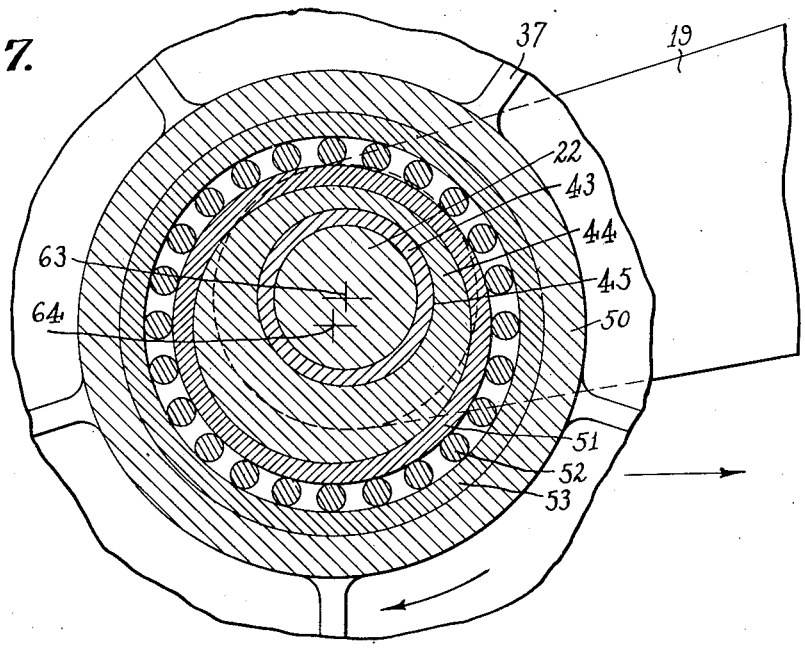
Fig. 7 is a section on line 7—7 of Fig. 6.
Figure 8:
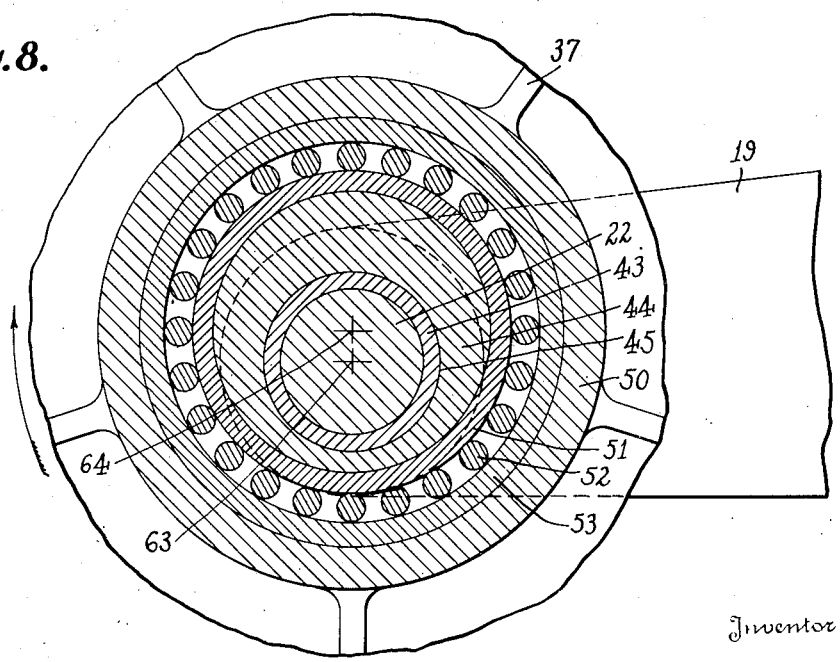
Fig. 8 is a view similar to Fig. 7, showing the wheel in an upper position in its support.

In Fig. 7, the parts are shown in the position corresponding to that of Fig. 4, and, in the former view, the center of the axle 22 is indicated by a cross mark 63, whereas the center of the skein, in other words the axis about which the wheel revolves, is indicated by a cross mark 64. It being noted that the direction of travel of the vehicle is toward the right of Fig. 7, as indicated by the arrow, it is apparent that axis 64 is below and to a slight extent rearwardly of axis 63 with respect to the vehicle. In this example, the angle of deflection of axis 64 from the vertical plane of axis 63 is about twenty-five degrees. In this position, the wheel is near the lower limit of its possible movement relatively to the supporting arm 19. In Fig. 8, the wheel is shown at the upper limit of its possible lift relatively to the supporting arm, for, in this position, the skein has been turned until its axis 64 is vertically above axis 63. In this particular case, the skein, in moving from the position of Fig. 7 to that of Fig. 8, has moved through an angle of about one hundred and fifty-five degrees. This is the same position shown in Fig. 5. As the skein is moved through this angle, the spring is wound, and the resistance becomes progressively greater as a result of the building up of the resistance. This resistance is increased also to an extent by the fact that after a certain amount of angular movement of the skein, the turns of the spring begin to make contact with each other, this effect commencing at the inner part of the spring and the effect being extended outwardly as the skein is turned farther. For the reason just stated, the spring has a snubbing action which causes a damping of the movably mounted wheel when it is subjected to impact from beneath, the tendency being to slow down and control the movement of the wheel center so as to prevent rebound and chattering.

It will be seen that arms 18 and 19, supporting the bogie wheels, are at small angles to a horizontal plane, in the position of Fig. 1, and that the springs 32, 33, acting on the pressure devices 31, exert a thrust on the wheels, the direction of which is substantially vertical. Through this thrust, the load of the vehicle is resiliently supported. The arms 18 and 19 swing on their pivots when the vehicle moves over uneven ground, as shown for example in Fig. 2 where the forward wheel is raised to a substantial extent by passage over an obstacle, but, in this case also, the thrust of the load bearing spring is substantially vertical; that is, it is exerted in a downward direction. The resilient mountings for the wheels, provided in this particular case at the ends of the supporting arms, are provided for a different purpose, namely, absorbing shocks due to uneven ground, and the thrust exerted by the springs 47 of the wheel mountings is exerted in a direction, for absorbing road shocks, this direction being at an angle to the thrust of the load bearing springs and, more specifically, in a lateral rather than a vertical direction. The arrangement is such that the springs 47 in the normal position of the wheels (Fig. 1) press them forwardly or press them with a large forward component so that, when a wheel encounters an obstacle such as shown in Fig. 2, it "gives" in a rearward direction, in other words, in a direction counter to the movement of the vehicle. Simultaneously, the entire wheel mounting may be lifting, as shown in Fig. 2, and compressing the load bearing springs. As the vehicle moves forwardly and encounters obstacles or uneven ground, the effect of the obstacles or uneven ground is that a blow is received counter to the direction of travel, and, by permitting the wheels under such circumstances to move rearwardly in their supports under the control of strong springs, such shocks are very well absorbed, and, in the case of a track laying vehicle, a bogie wheel, mounted in the manner described, will cushion the track and will support and hold it in a manner which has not been possible heretofore.

In the case of a track laying vehicle, where the shock is transmitted to the bogie wheel through the track, it is advantageous to position the skein axis 64 somewhat rearwardly of the axis of the axle, but, in some cases, it may be advantageous to position the skein axis directly below the center of the axle.

Another advantage of the improved structure results from the relatively wide angle of movement provided for the skein as the wheel is lifted relatively to its supporting arm or other support. In the case illustrated, this angle is about one hundred and fifty-five degrees, and, as the wheel axis moves through such an angle, its movement can be damped and controlled in a very effective way. Such a wide angle may not be necessary in all cases, and that mentioned is merely by way of example.

It is understood, of course, that, while the forward bogie wheel illustrated is carried by forwardly projecting arms and the rear wheel by trailing arms, the cushioned or knee action mountings of the two wheels are arranged and act in the same manner. In the case shown, the bolts 49, to which the ends of the springs 47 are secured, in the normal position (Fig. 1), are located in the same vertical plane as the associated axle 22. It is, however, obvious that variation may be made in this respect and in others.

In the initial setting of the described torsion joint between the wheel and its axle, a line intersecting the axle center and the wheel center will form an angle of about sixty-five degrees to a horizontal plane, the wheel center being, therefore, beneath or under the axle center to facilitate rearward movement of the wheel center when the vehicle meets an obstacle. This specific angle is not of importance, but, in order to secure the best results, the angle from the horizontal should be in excess of thirty-five degrees in order that substantial rearward movement of the skein relatively to its support may be permitted.

By the present invention, the problem of proper springing of the vehicle wheels is much easier of solution than heretofore, and this is especially true in the case of track laying vehicles although the invention is not limited in its application to vehicles of that nature. The cushioned wheel mountings, provided in addition to the load bearing springs, enable the vehicle to make much better progress over rough ground, the shocks or impacts being absorbed much more effectively than heretofore, and the travel, for that reason, being very much smoother, there also being much less vibration.

Another very important advantage is that, as a result of the present improvements, the wear on the rubber tires of the bogie wheels is very much decreased, and this is a very important factor at the present time because of the scarcity of rubber. In the ordinary tractor vehicle, the bogie wheel tires receive very hard wear and require replacement very frequently, and overcoming this drawback is in itself a notable advance.

The spiral springs used in connection with the torsion joints between the wheel and axle, which include the eccentrically mounted skeins, are very strong and withstand hard use for a long period. Also, the torsion joints which are provided are of simple and sturdy structure, and there are no difficult problems in connection with maintaining the resiliently mounted wheels in good running condition. A spring such as herein described forms a very satisfactory external connection between the skein and the wheel support, permitting a controlled rearward movement of the wheel when a road shock is encountered. A spring of the form described gives a very satisfactory control of the movement which is permitted between the wheel and the supporting arm or other member which supports it, such movement in this case being in a rearward direction, generally speaking, when an obstacle is encountered, and in a forward direction to restore the parts of their initial position. It is primarily the movement to a rearward position which permits the shock to be absorbed so effectively, the load of the vehicle being carried by other springs. The snubbing or damping effect provided by the skein-connected springs is also a matter of distinct advantage.

Nothing herein contained is to be understood as asserting a claim to the particular manner of connecting the spiral spring to the skein or the particular means used for mounting and locating the end cap and bearing adjusting nut at the other end of the axle.

It is understood, of course, that the radial lug 60 or equivalent part carried by the skein, in contacting the cooperating stop member carried by the wheel support, acts to maintain the skein normally in a position in which the wheel center is below the axle center and can move upwardly and rearwardly and then upwardly and forwardly when the vehicle receives a road shock. When this occurs, the stop carried by the skein moves away from the stop carried by the axle support. As the vehicle moves over the obstacle or the like, the spiral spring acts to return the parts to their initial position with the skein stop again in contact with the stop on the axle support.

In referring to a "pancake spiral" spring it is intended to indicate that the spring lies in substantially a single plane, as distinct from a volute spring, which is extended in the direction of the axis of the coil.

While I have shown herein only a single embodiment of the invention, it is understood that numerous other embodiments are within the principles of the invention and that various modifications in the organization of parts and in the details can be made within the scope of the claims.

What I claim is:

1. In a vehicle wheel mounting, the combination of a wheel, a wheel support, means for mounting the wheel support from the vehicle body which permits upward movement of the wheel under load, a load carrying spring resisting such movement, and cushioning connecting means between the wheel and the wheel support allowing limited movement of the wheel with respect to the wheel support in a generally rearward direction under road impact, the wheel center being capable of upward and rearward swing through an arc in excess of 35° and being capable of swinging movement through an arc of more than 100°.

2. In a tractor vehicle, the combination of a vehicle body, an endless driven ground engaging track at one side of the body, an axle, a swinging arm carrying said axle from the body, a spring acting on said arm, a skein mounted for turning on the axle on an axis eccentric to the skein, a bogie wheel engaging the lower run of the track and revolubly mounted on the skein, and resilient means normally holding the skein in a predetermined angular relation to the axle connecting the skein exteriorly to the arm, said skein normally having its center below and somewhat rearwardly of the axle center.

3. In a tractor vehicle, the combination of a vehicle body, an endless driven ground-engaging track at one side of the body, an axle, a swinging arm carrying said axle from the body, a spring acting on said arm, a skein mounted for turning on the axle on an axis eccentric to the skein, a bogie wheel engaging the lower run of the track and revolubly mounted on the skein, and resilient means normally holding the skein in a predetermined angular relation to the axle connecting the skein exteriorly to the arm, said skein normally having its center below and somewhat rearwardly of the axle center, and the wheel center being capable of a swinging movement in excess of 100° relatively to the axle.

4. In a wheel mounting, the combination of a vehicle body, an arm pivoted at one end to said body, spring means exerting downward thrust on said arm, an axle carried by said arm, a skein mounted for turning on the axle on an axis eccentric to the skein, a supporting wheel for the body revolubly mounted on the skein, a spiral spring connected at the outer end to the arm and at the inner end to the skein, said skein and spring being arranged so that the wheel center is normally below the axle center and is capable of movement rearwardly and upwardly with reference to the vehicle body when an obstacle is encountered, and a stop member carried by the skein which in the normal position of the wheel engages a cooperating stop carried by the axle support and moves away from said cooperating stop when an obstacle is encountered.

5. The combination of a vehicle body, a wheel support movably carried by said body, an axle carried by said wheel support, a skein mounted for turning on the axle on an axis eccentric to the skein, a supporting wheel for the body revolubly mounted on the skein, a spiral spring connected at the outer end to the wheel support and at the inner end to the skein, said skein and spring being arranged so that the wheel center is normally below the axle center and is capable of movement rearwardly and upwardly with reference to the vehicle body when an obstacle is encountered, and a stop member carried by the skein which in the normal position of the wheel engages a cooperating stop carried by the axle support and moves away from said cooperating stop when an obstacle is encountered.

6. A device such as set forth in claim 5, in which the cooperating stop is located in proximity to the connection of the spring to the wheel support.

7. The combination of a vehicle body, a travelling endless ground-engaging track mounted on the vehicle body, a bogie wheel supporting the lower run of said track, an axle for said wheel, a member mounting said axle movably from said body, a spring controlling movement of said member, a skein member interposed between the bogie wheel and the axle providing for arcuate upward and rearward movement of the wheel center relatively to said mounting member when the adjacent track portion encounters an obstacle, and a spiral spring controlling the last-mentioned movement of the wheel connected at one end to the skein and at the other end to said mounting member.

8. The combination of a vehicle body, a supporting wheel supporting the body in its movement over the ground, and means for mounting the wheel so that under ground impact it moves rearwardly and upwardly, said means including an axle for the wheel, an axle-carrying member movably supported from said body, a load-supporting spring controlling said axle-carrying member, and a spring-pressed skein interposed between the wheel and the axle permitting upward and rearward swing of the wheel center relatively to the axle through an arc of more than 35°.

9. In a wheel mounting of the type involving an axle, a sleeve embracing the axle, a skein mounted for turning on the sleeve on an axis eccentric to the skein, a wheel revolubly mounted on the skein, anti-friction bearings interposed between the skein and the wheel, and a resilient member acting on the skein, the combination of a skein having an end extension with a recess at one end around the axle, a thrust collar in said recess acting against one end of said sleeve, a nut for taking up on the anti-friction bearings located at the side of the wheel opposite said skein extension, an end cap overlying said nut, and a thrust collar enclosed by said end cap acting against that end of the sleeve which is adjacent said nut.

10. The combination of a vehicle body, a travelling endless ground-engaging track mounted on said body, a bogie wheel supporting the lower run of said track, and means for mounting said wheel so that under ground impact it moves rearwardly and upwardly, said last-named means including arms pivoted in relation to the vehicle body and having free ends, an axle carried by said free ends, and cushioning means interposed between said axle and the wheel enabling the wheel center to move in an arc with respect to the axle center, said cushioning means including a skein eccentrically mounted on the axle and having an extension at one end beyond the wheel and also including a pancake spiral spring connected at its inner end to said skein extension and at its outer end to one of said arms, and a stop member carried by the skein which in the normal position of the wheel engages a cooperating stop carried by the axle support in order to hold the spring at a definite partly wound position, said stop member being free to move away from said cooperating stop when an obstacle is encountered, the wheel center when the adjacent track portion meets an obstacle having an upward and rearward swing which may carry through an arc of more than 35°.

11. The combination of a vehicle body, a wheel support movably connected to said body, a spring acting on said support and sustaining a part of the body weight, an axle carried by said wheel support in fixed relation thereto, a skein mounted for turning on the axle by means of an eccentric skein bore, a supporting wheel for the body revolubly mounted on the skein, a spiral spring connected at the inner end to the skein and at the outer end to a part in fixed relation to the wheel support, and co-acting stop members carried respectively by the skein and wheel support which limit the angular movement of the skein, the wheel center being positioned below the axle center when the vehicle travels over a smooth surface and capable of movement rearwardly and upwardly with reference to the direction of vehicle travel.

12. A vehicle having a driven endless track, a body carrying the track, a bogie wheel having a spring-pressed carrier pressing it downwardly against the lower run of the track and having an axle fixed in respect to said carrier, and an eccentrically bored independently sprung skein interposed between the wheel and the axle providing a cushioned mounting which raises and lowers the wheel with respect to its carrier as the skein is turned, the skein when the vehicle travels over a smooth surface having its center below the axle center and the skein being free to swing upwardly and rearwardly when the track portion supported by the wheel encounters an obstacle.

13. The combination of a vehicle body, a wheel support movably connected to said body, a load-carrying spring acting on said wheel support, an axle in fixed position with respect to said wheel support and carried thereby, a wheel, a spring-pressed skein supporting said wheel having an eccentric bore by which it is mounted on said axle and adapted to raise and depress the wheel with relation to the wheel support when the skein is turned on the axle, and means limiting the angular movement of the skein, said skein having its center below the axle center when the vehicle moves over a smooth surface and the skein being free to move upwardly and rearwardly through an arc in excess of 35° when the vehicle meets an obstacle.

14. The combination of a vehicle body, a wheel support movably connected to said body, a load-carrying spring acting on said wheel support, an axle in fixed position with respect to said wheel support and carried thereby, a wheel, a spring-pressed skein supporting said wheel having an eccentric bore by which it is mounted on said axle and adapted to raise and depress the wheel with relation to the wheel support when the skein is turned on the axle, and means limiting the angular movement of the skein, said skein having its center below the axle center when the vehicle moves over a smooth surface and the skein being free to move upwardly and rearwardly through an arc in excess of 35° when the vehicle meets an obstacle, said limiting means including stops which are substantially in engagement with each other in the normal travelling position but are separated from each other when an obstacle is encountered.

WALTER F. HEROLD.

REFERENCES CITED

The following references are of record in the file of this patent:

UNITED STATES PATENTS

| Number | Name | Date |
|---|---|---|
| 684,997 | Matheson | Oct. 22, 1901 |
| 1,020,105 | Matteson | Mar. 12, 1912 |
| 2,093,456 | Knox | Sept. 21, 1937 |
| 2,193,567 | Pointer | Mar. 12, 1940 |
| 2,377,232 | Herold | May 29, 1945 |
| 2,393,369 | Hait | Jan. 22, 1946 |